(12) United States Patent
Fairchild (10) Patent No.: US 6,583,951 B1
(45) Date of Patent: Jun. 24, 2003

(54) SHUTTLE MOTION MECHANISM (75) Inventor: Scot Clifford Fairchild, Santa Clara, CA (US)

(73) Assignee: Terastor Corporation, San Jose, CA (US)

( * ) Notice: Subject to any disclaimer, the term of this patent is extended or adjusted under 35 U.S.C. 154(b) by 0 days.

(21) Appl. No.: 09/441,156

(22) Filed: Nov. 12, 1999

(51) Int. Cl.[7] .............................................. G11B 17/04
(52) U.S. Cl. ................................................... 360/99.06
(58) Field of Search .......................... 360/99.06, 99.07, 360/99.02, 99.03, 133; 369/75.1, 75.2, 77.1, 77.2, 289, 291, 275.5

(56) References Cited

U.S. PATENT DOCUMENTS

| | | | | | |
|---|---|---|---|---|---|
| 4,773,061 A | * | 9/1988 | Stark et al. | ................. | 369/291 |
| 4,817,079 A | * | 3/1989 | Covington | ................. | 369/291 |
| 4,837,784 A | * | 6/1989 | Yamamori | ................. | 369/289 |
| 4,849,959 A | * | 7/1989 | Jensen | ................. | 369/291 |
| 4,852,078 A | * | 7/1989 | Miller | ................. | 369/291 |
| 4,853,926 A | * | 8/1989 | Covington et al. | ......... | 369/291 |
| 4,881,218 A | * | 11/1989 | Yamamori | ................. | 369/289 |
| 5,003,530 A | * | 3/1991 | Yamamori | ................. | 369/289 |
| 5,084,854 A | * | 1/1992 | Ikedo et al. | ............. | 369/75.1 |
| 5,204,853 A | * | 4/1993 | Kamoshita | ................. | 369/289 |
| 5,208,802 A | * | 5/1993 | Suzuki et al. | ............. | 369/289 |
| 5,220,552 A | * | 6/1993 | Yokoi et al. | .............. | 369/77.2 |
| 5,541,809 A | * | 7/1996 | Kakizaki et al. | .......... | 361/683 |
| 5,570,342 A | * | 10/1996 | Kosaka | ...................... | 369/291 |
| 5,737,185 A | | 4/1998 | Morrison et al. | | |
| 5,768,241 A | * | 6/1998 | Kanagawa et al. | ........ | 369/77.2 |
| 5,768,253 A | * | 6/1998 | Tricart | ........................ | 369/291 |
| 5,771,143 A | * | 6/1998 | Vernois | ...................... | 360/133 |
| 5,867,476 A | * | 2/1999 | Yoshida et al. | ............ | 369/289 |
| 5,912,875 A | * | 6/1999 | Lowe et al. | ................. | 369/291 |
| 5,917,795 A | | 6/1999 | Furukawa et al. | | |
| 5,930,090 A | | 7/1999 | Schick et al. | | |
| 5,936,935 A | * | 8/1999 | Hanakawa et al. | ........ | 369/291 |
| 5,995,345 A | * | 11/1999 | Overbo | ....................... | 360/133 |
| 6,002,556 A | * | 12/1999 | Oishi | ......................... | 360/133 |
| RE36,511 E | * | 1/2000 | Liou et al. | ................ | 369/77.1 |
| 6,172,962 B1 | * | 1/2001 | Goto et al. | ................ | 369/291 |
| 6,205,114 B1 | * | 3/2001 | Takekoh | ..................... | 369/291 |
| 6,215,760 B1 | * | 4/2001 | Hanakawa et al. | ........ | 369/291 |
| 6,239,949 B1 | * | 5/2001 | Funawatari et al. | ....... | 360/133 |
| 6,243,356 B1 | * | 6/2001 | Robino, III | ................ | 369/291 |

* cited by examiner

Primary Examiner—George J. Letscher
(74) Attorney, Agent, or Firm—Fish & Richardson P.C.

(57) ABSTRACT

A method and an apparatus to provide controlled horizontal and vertical movements of a disk shuttle inside a disk drive, and also to open/close an access door on the shuttle for accessing one or more recording media inside the shuttle.

19 Claims, 8 Drawing Sheets

SHUTTLE MOTION MECHANISM

BACKGROUND

The present invention relates to a shuttle motion assembly to be used in a data storage system. In particular, this application relates to a shuttle motion assembly which provides horizontal, vertical, and door-accessing movements to place the shuttle into, or out of, a proper operation position in a disk drive.

Data storage is an important aspect of today's information technology. In order to meet the ever stronger demand for higher capacity storage devices, the areal data density of a storage medium has been increasing steadily. Various types of disks, including magnetic disks and optical disks, constitute recording media.

Magnetic storage devices such as fixed or removable magnetic A disks and tapes are widely-used conventional storage devices. The state-of-art conventional magnetic hard drive systems can achieve extremely high linear bit densities on the order of magnitude of about one gigabit per square inch. One limitation in increasing areal data density in a magnetic device is the particle size or the characteristic dimension of a typical magnetic domain of the magnetic recording materials. Other limitations include the width of the magnetic read/write head and the limitations of mechanical tracking. Therefore, these hard drives are typically limited to less than 10,000 tracks per inch.

Optical storage devices are emerging as an alternative technology to the conventional magnetic technology because of their potential for high density data storage. The areal density of an optical storage device, in principle, is only limited by the diffraction limit of an illuminating optical beam for reading or writing. One type of commercial optical storage technology is based on magneto-optical materials. These materials currently produce an areal data density of about one giga bits per square inch.

Data is generally stored in each disk in a series of concentric or spiral tracks. These tracks are accessed by one or more read/write heads in the head assembly. A head is mounted to an arm that is in turn mounted to the voice coil motor, such as a rotary voice coil actuator.

The disk and the head assembly are delicate mechanisms requiring protection. In order to protect against mechanical stress or contamination, a disk is sometimes designed to be inside a shuttle, which is then protected by a hard casing, or a cartridge. In such a design, when a disk is loaded into the disk drive, the cartridge is first removed, and the shuttle is then loaded into the disk drive.

During operation, it is necessary to move the head from a current position to a target track in an operation referred to as a "seek" operation. In such a seek operation, a command is provided to the data storage device to access a certain sector on the disk(s). If the head is not positioned over a target track containing the desired sector, a seek profile is determined. The seek profile contains various parameters associated with the head, including acceleration, deceleration, velocity and position information of the head. The seek profile is used to move the head from its current position to the target track by moving the head to the target track.

Once the head is positioned over the target track, the head is maintained over the target track's center line for accurate read/write operations in an operation known as track following. A position error signal (PES) is generated based on variations of the head from the center line of the target track. The PES is part of a closed-loop servo drive system which obtains actual head position information based on a servo pattern and compares the servo pattern to the desired head position information. When the PES identifies a variation, the servo control system provides correction commands to the voice coil motor to accurately maintain the head over the center line of the target track.

The above paragraphs illustrates the need for repeatable, precise positioning of the disk inside a disk drive for information retrieval.

Because of the precise positioning required to read/write data from/to a disk, a loading mechanism to control the shuttle motion inside a disk drive is required. Moreover, the shuttle movements are best handled by an apparatus rather than by a user. Therefore, there is a need for an invention to provide a stand alone shuttle loading mechanism fitted in a disk drive to precisely place the shuttle inside the drive.

SUMMARY

The advantages of this invention include one or more of the following:

This invention provides an easy-to-assemble, single-assembly shuttle motion assembly to perform several complex types of movements. In this mechanism, assemblies to control movements along a horizontal plane, a vertical plane, and door opening/closing motions are compactly assembled in one stand-alone unit. This unit provides repeatable, reliable positioning of the shuttle inside a disk drive.

Furthermore, putting the different motion assemblies into a stand-alone unit simplifies the task of assembling the disk drive, which has to perform many other complex functions. This stand-alone unit can be assembled separately then fitted into the disk drive.

Another advantage of this mechanism is that it is driven by a single motor and drive train. Yet another advantage of this mechanism is its use of circular cams to amplify a small radial movement into a relatively large linear movement.

In general in one aspect, the invention provides a shuttle motion assembly positioned in a disk drive to load and unload a shuttle. It includes a base plate, a plurality of cams positioned on the base plate, a hook positioned above the base plate to remove from a cartridge. A horizontal motion assembly is positioned on the base plate to create horizontal movement of the shuttle within the disk drive, a vertical motion assembly is positioned on the base plate to create vertical movement of the shuttle for mounting the disk contained in the shuttle on a spinning motor and, a shuttle-door accessing mechanism is positioned above the plurality of cams to open a door on the shuttle for accessing the recording media inside the shuttle.

Implementation of the invention may include the following. A horizontal motion assembly has a plurality of interconnected cams and levers. The horizontal motion assembly may include a plurality of channels in which the plurality of levers travel. The plurality of cams may be formed of plastic and may be radial cams. At least one cam of the plurality of cams may include recessed patterns on a top surface and a bottom surface, recessed patterns may be configured to move the shuttle inside the disk drive. The plurality of interconnected levers and cams may be metallic. The vertical-motion assembly may have a plate cam, with a recessed pattern for directing vertical movement of the shuttle. The shuttle-door accessing mechanism may consist of a plurality of levers, one of the levers may have a pin to engage an access hole located at a bottom surface of the shuttle. The access door may open circumferentially. The hook may be configured to reach inside the cartridge to pull the shuttle into the disk drive.

In another aspect, the invention is directed to a shuttle motion device positioned in a disk drive for loading/ unloading a shuttle containing a disk into/out of the disk drive. The device has a base plate, and a horizontal motion assembly positioned on the plate to move the shuttle along a horizontal plane to place the shuttle into/out of the disk drive for engaging/disengaging a motor for spinning one or more recordable medium contained in the shuttle. The assembly has a plurality of circular cams and a plurality of channels for guiding a plurality of levers.

The implementation of the invention may include one or more of the following: a vertical motion assembly positioned on the base plate,with a lever and a cam plate, and a door-accessing mechanism to open an access door of the shuttle. The door-accessing mechanism may have a lever with an engagement pin to engage a door access hole on the shuttle, and a plurality of interconnected levers. Each circular cam may have a top surface and a bottom surface. Each surface may include grooved patterns to control a sequence of movements among the plurality of levers to effect movements of the shuttle. It may have a hook to pull the shuttle into the disk drive.

In another aspect, the invention is directed to a method of positioning a disk shuttle inside a disk drive. The method includes one or more of the following. Placing the shuttle at an entry door of the disk drive, moving the shuttle along a horizontal plane to place it over a motor inside the disk drive for spinning a disk contained inside the shuttle, lowering the shuttle along a vertical plane to mount the shuttle on the motor, and activating a door-access mechanism to open a door on the shuttle to expose the disk.

Implementations of the invention may include the step of removing the shuttle from a cartridge. The removing step may be conducted by a hook which latches to the shuttle. It may have a plurality of cams with recessed patterns to-position the shuttle inside the disk drive with repeatable precision. The plurality of cams and a plurality of levers connected thereto may constitute a motion amplification mechanism. It may provide a gear train and a motor to furnish movement power.

DETAILED DESCRIPTION

Figure 1:
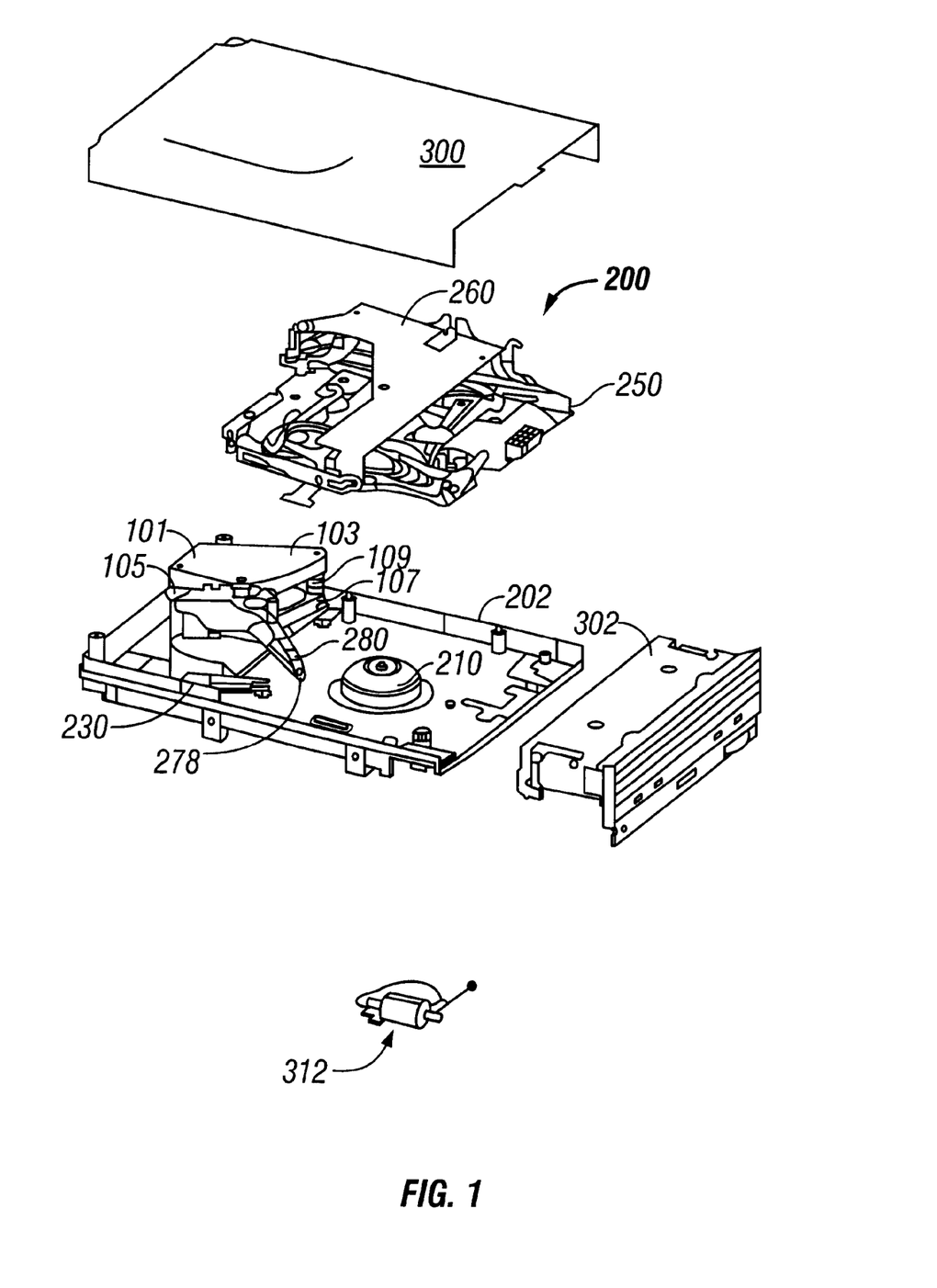
FIG. 1 is an exploded view of the disk drive showing the position of the shuttle motion assembly in relation to other components of the disk drive.

FIG. 1 shows an exploded view of an optical data storage device. A shuttle motion assembly 250 and a cover plate 260 is positioned o of the spindle motor 210 within the base gear 202. The shuttle motion assembly 250 accepts a cartridge (not shown)), loads the shuttle inside the cartridge carrier and opens a shuttle door for access by the flying head 280.

The disk cartridge is used to minimize contamination by keeping a disk out of reach of a user at all times. In loading a disk, the cartridge is temporarily docked to the disk drive. The cartridge door is then opened and the shuttle is automatically removed from the cartridge and transferred into the disk drive. At this time, the empty cartridge can be removed from the disk drive. In unloading a disk, an empty cartridge is temporarily docked to the drive. The docking system automatically transfers the shuttle from the disk drive to the cartridge. The shuttle enclosed in the cartridge is then removed from the disk drive.

An actuator assembly 101 is mounted on the the base 202. The actuator assembly 101 has top and bottom pole pieces 103 and 107, respectively. The top pole piece 103 has an opening which is adapted to receive a first standoff 109. The top pole piece 103 also has another opening which is adapted to receive a second standoff 105. The standoffs 105 and 107 are positioned in corresponding openings of the bottom pole piece 107. Particularly, the standoff 109 has a recessed region along its height between two hexagon nuts to provide room to slip a protective rubber which protects the read/ write head 280 against damage due to a crash of a carriage containing the head. The read/write head 280 also includes stinger 278, which is the contact point with the ramp motion mechanism 230.

To complete the assembly 200, a cover 300 is attached to the base gear 202. Further, a face plate assembly 302 is mounted to the front of the base gear 202 to provide data access information to the user through light-emitting diodes (LEDs). Finally, the motor and gear train assembly 312 is used to power the complex motion of the shuttle motion assembly 250.

Figure 2A:
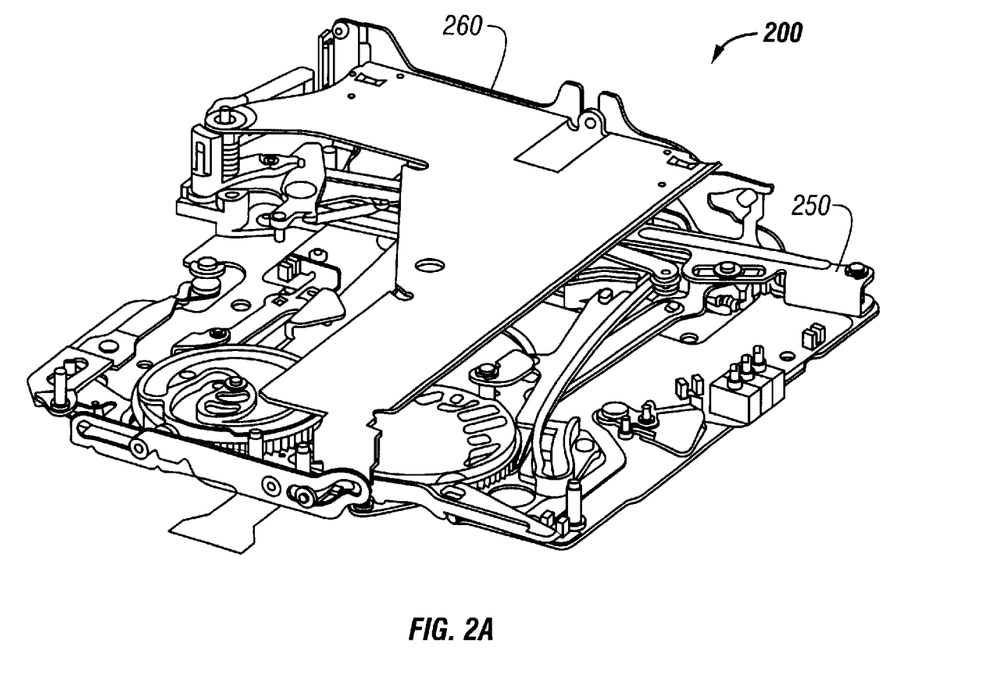
FIG. 2A is a perspective view of the shuttle motion assembly.
Figure 2B:
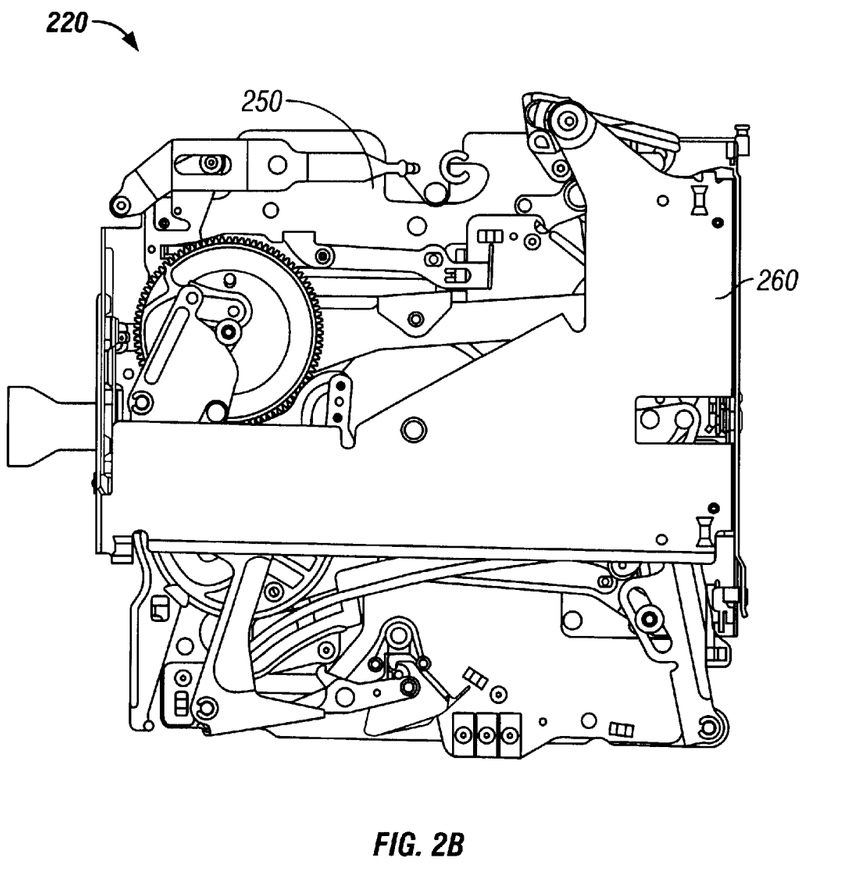
FIG. 2B is a top view of the shuttle motion assembly of FIG. 2A.
Figure 2C:
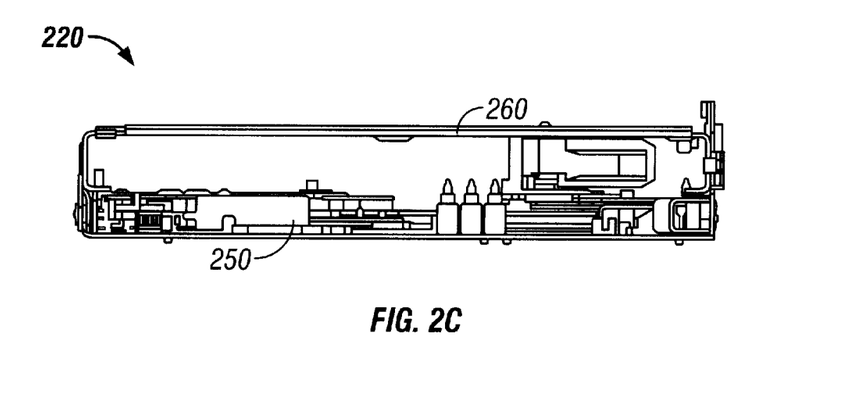
FIG. 2C is a side view of the shuttle motion assembly of FIG. 2A.

FIGS. 2A–2C are enlarged and different views of the shuttle motion assembly 200 to provide better views of the shuttle motion assembly 220. FIG. 2A is the perspective view of the assembly 220. FIG. 2B is the side view of the assembly 220. FIG. 2C is, the side view of the assembly 220. Shuttle motion assembly 250 performs several motion functions including: pulling a shuttle out of a containing cartridge, moving the shuttle along a horizontal plane, moving the shuttle along a vertical plane, and opening the access door on the shuttle. However, the components used to effectuate the complex motions are conveniently assembled into one-piece stand-alone unit 250. A top plate 260 is provided for shuttle motion assembly 250.

Figure 3:
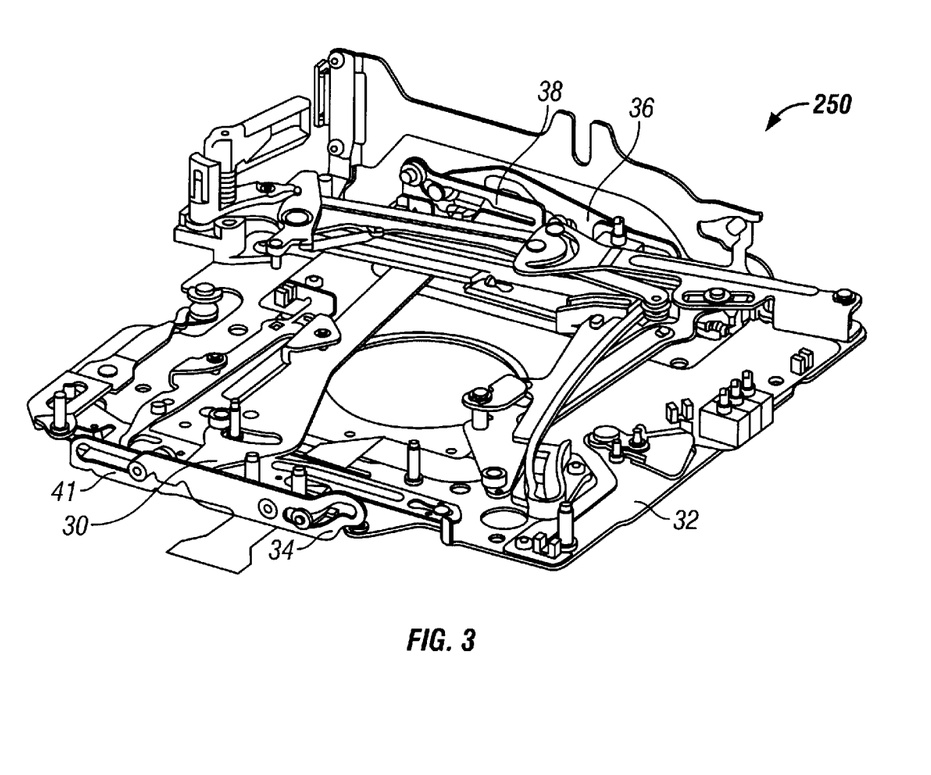
FIG. 3 is the perspective view of the assembled vertical movement assembly in the shuttle motion assembly.

FIG. 3 shows a perspective view of the components, among other components, that cooperate to move the shuttle along a vertical plane inside the disk drive. A cross link 30 is mounted on base plate 32 of the shuttle motion assembly 250. Connected to the one end of the cross link 30 is the first cam plate 34, connected to another end of the cross link 30 is the second cam plate two 36. Cam plates 34 and 36 have identical structures and connections to move the shuttle vertically with even force on both sides of the cross link 30. Connected to cam plate 36 is lever 38. A similar cam lever 41 is connected to cam plate 34.

As the cross link 30 rotates counter-clockwise the cam plates 34 and 36 cause the cam levers 38 and 41 to move downward. The pins on the end of the cam levers 38 and 41 are connected through roller to the top plate 260. A shuttle in use is captured inside the top plate 260; consequently, the shuttle is moved vertically downward as a result of the counter-clockwise motion of the cross link 30. Likewise, clockwise motion of the cross link 30, causes a shuttle to move vertically upward.

Figure 4A:
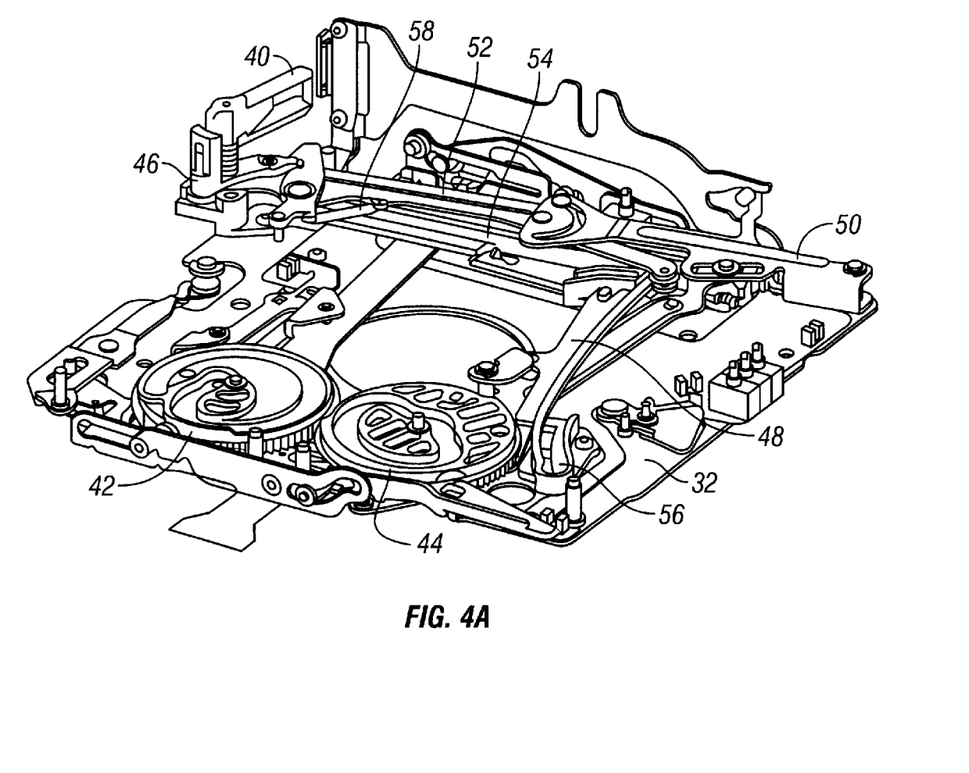
FIG. 4A is the perspective view of the assembled horizontal movement assembly in the shuttle motion assembly.

FIG. 4A is the perspective view of the components, among other components not shown here, that move the shuttle along a horizontal plane inside the disk drive. Hook bail 40 is a latch that attaches to a shuttle to pull the shuttle out of the containing cartridge into the disk drive. Attached to the hook bail is hook socket 46.

Once inside, the main components that determine the precise, repeatable motions of the shuttle are preprogrammed into a plurality of circular cam gear, cam 42 and cam 44. Cams 42 and 44 both have recessed patterns, or grooves, which determine the movements of the shuttle. Because the initiating movements of the cam gear cam 42 and cam 44 pushing on the plurality of horizontal levers, rollers are small in relation to the resulting movements of the shuttle, in one aspect, the moving components constitute a motion amplification mechanism. The ratio of these motions, or amplification, is on average 9.5 to 1. The motion is created through a number of levers, rollers and cams as follows.

The cams 42 and 44 moves a roller mounted on the horizontal lever 48. The horizontal lever 48 pivots on a pin mounted to the base plate 32. The other end of the horizontal lever 48 also has a roller which moves the crank 50. Crank 50 pivots on a pin mounted to the base plate 32. On the end of the crank 50 is mounted the boot 52. The boot 52 pivots near its center where it is mounted on the crank 50. Each end of the boot 52 has a roller which is guided by channels 54 and 56 which have cam profiles to allow the boot 52 to translate and rotate in a singular, specific motion. In addition, on one end of the boot 52 is a tall pin on which mounts the hook socket 46 and its attached hook bail 40. The socket 46 pivots on the tall pin and traps the hook bail 40. The hook bail 40 can both pivot and slide on the tall pin. The socket 46 is connected to one of the rollers that moves in the channel 52 so that the roller controls the initial motion of the socket 46. After the initial motion of the socket 46, the socket 46 is held by a spring loaded lock 58. The hook bail 40 is the interface with a shuttle. The hook bail 40 catches the shuttle and pulls it in straight line motion from the cartridge into the drive, a distance of approximately 115 mm.

Figure 4B:
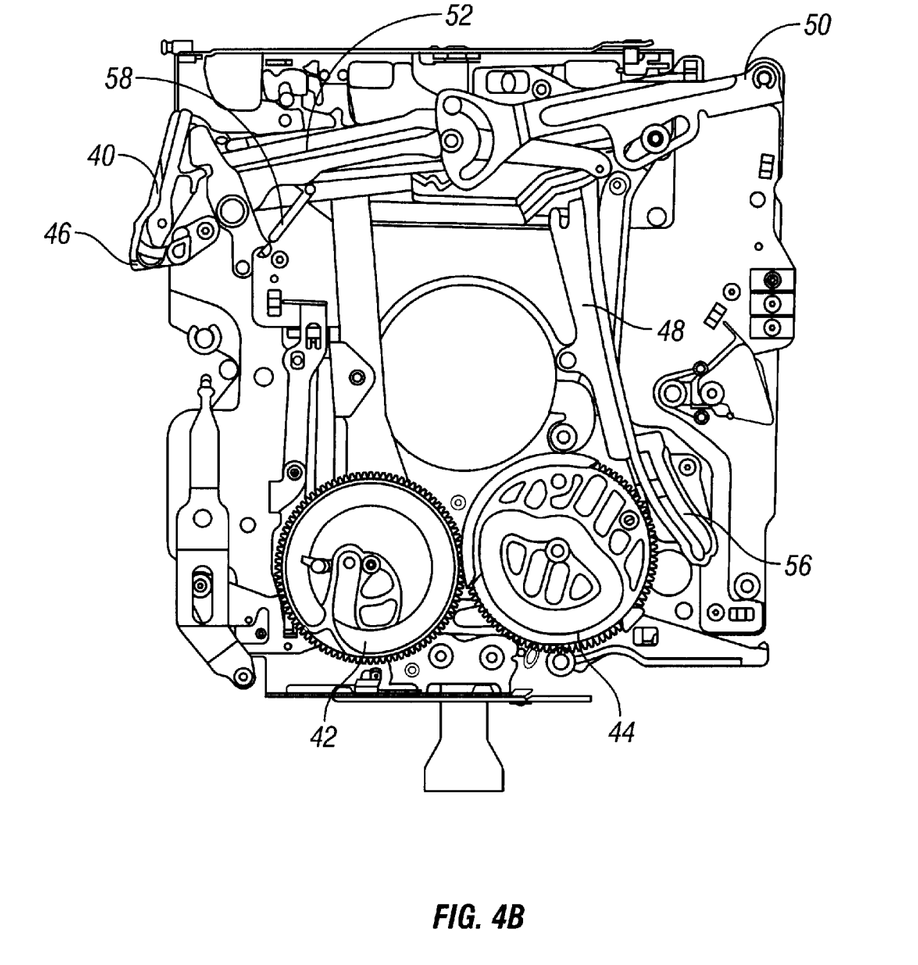
FIG. 4B is the top view of the horizontal movement assembly of FIG. 4A.

FIG. 4B is simply the top view of the components shown in FIG. 4A.

Figure 5:
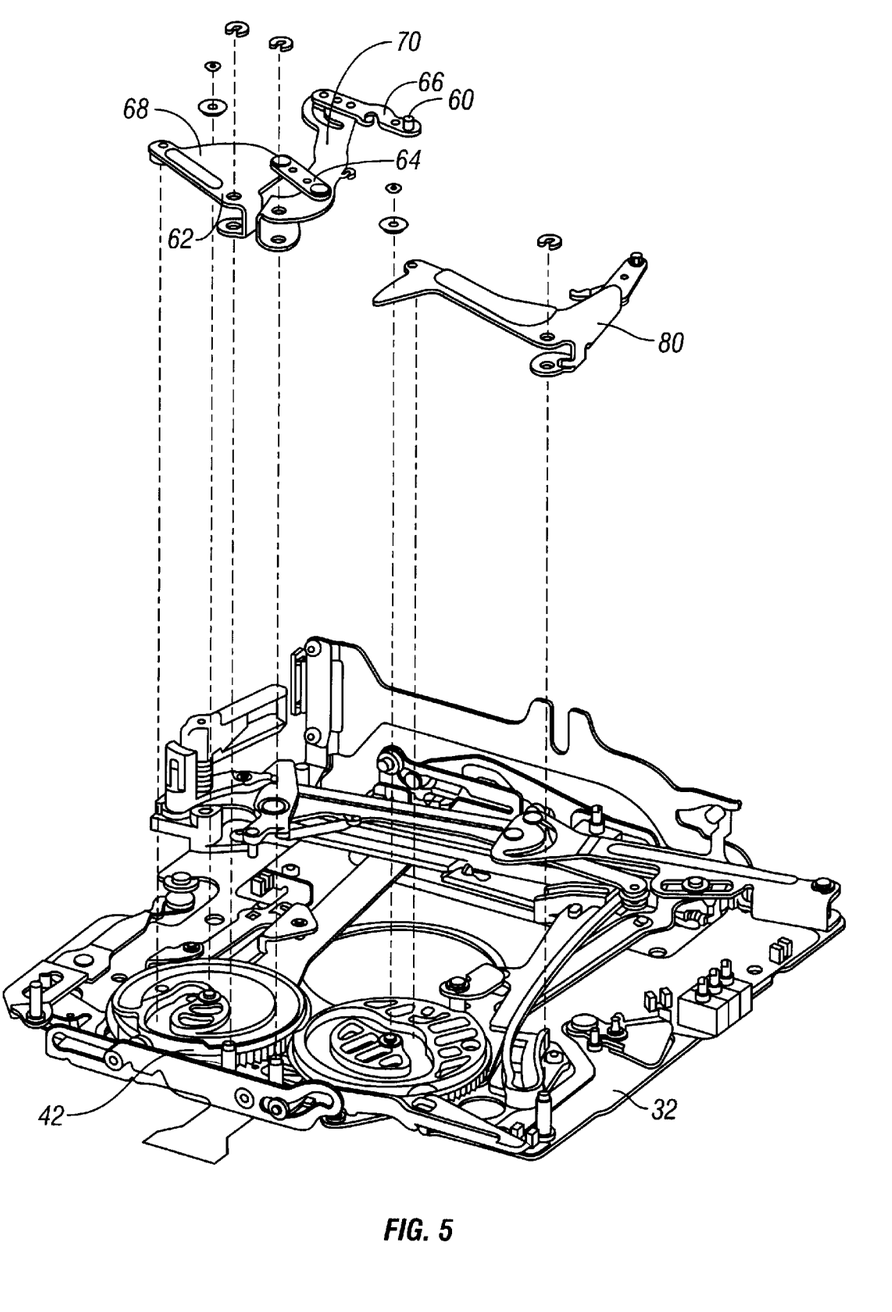
FIG. 5 is the assembly diagram of the door-accessing mechanism in the shuttle motion assembly.

FIG. 5 is an assembly view of the components forming the door-accessing mechanism. Assembly 80 is used to open the drive door. Assembly 62 is used to open the shuttle door, to be explained in more details below.

The shuttle door opening assembly 62 begins with the shuttle being lowered over the engagement pin 60. The engagement pin 60 engages the shuttle door by means of a hole in the door, as will be shown in FIGS. 6A and 6B. The motion to open the door is created as follows. The second cam gear 42 moves the roller mounted on the shuttle cam lever 68. The shuttle cam lever 68 pivots on a pin mounted to the loader plate 32. A linkage 64 mounted to the shuttle cam lever 68 causes the shuttle opener lever 70 to pivot on a pin mounted to the loader plate 32. The opener lever 66 is mounted on the end of the shuttle opener lever 70 and is spring reloaded against a stop. The engagement pin 69 is mounted on the end of the opener lever 66. As the shuttle opener lever 70 rotates, the engagement pin 60 causes the shuttle door to open. The shuttle door is closed by reversing the direction of motion.

Figure 6A:
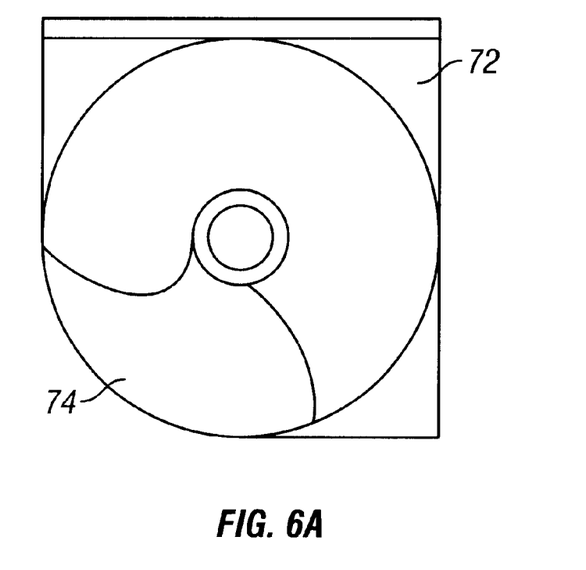
FIG. 6A the top view of the shuttle.
Figure 6B:
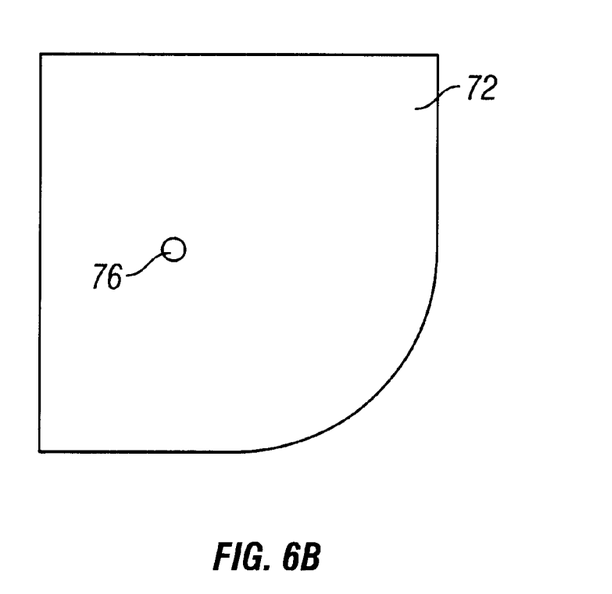
FIG. 6B is the bottom view,of the shuttle.

FIG. 6A is the top view of the shuttle 72, and FIG. 6B is the bottom view of the shuttle 72. The top view shows an access door 74 which opens circumferentially to expose the recording media contained inside. The bottom of the shuttle 72 has a small hole 76, and engagement pin 60 from FIG. 5 engages hole 76 to open the access door 74 circumferentially.

The present invention has been described in terms of specific embodiments, which are illustrative of the invention and not to be construed as limiting. Other embodiments are within the scope of the following claims.

What is claimed is:

1. A shuttle motion assembly, positioned in a disk drive to load and unload a shuttle that holds a disk with recording media comprising:
   a base plate;
   a plurality of circular cams positioned on the base plate whose rotations control movements of the shuttle;
   a hook positioned above the base plate and mechanically driven by the circular cams to remove from a cartridge the shuttle contained therein;
   a horizontal motion assembly positioned on the base plate to receive the shuttle from the hook and mechanically coupled to the circular cams to create horizontal movement of the shuttle within the disk drive;
   a vertical motion assembly positioned on the base plate and mechanically coupled to the circular cams to create vertical movement of the shuttle for mounting the disk contained in the shuttle on a spinning motor; and
   a shuttle-door accessing mechanism positioned above and mechanically coupled to the plurality of the circular cams to open a door on the shuttle for accessing the recording media inside the shuttle.

2. The shuttle motion assembly of claim 1, wherein the horizontal motion assembly further comprises horizontal lever mechanically coupled to the plurality of the circular cams to pivot around a first fixed pin mounted to the base plate, a crank movably engaged to the horizontal lever and to pivot around a second fixed pin mounted to the base plate in response to movement of the horizontal lever, a boot pivotably engaged to the crank, and channels to guide the boot in response to rotations of the circular cams.

3. The shuttle motion assembly of claim 1, wherein the plurality of cams are formed of plastic.

4. The shuttle motion assembly of claim 1, wherein the plurality of cams are radial cams.

5. The shuttle motion assembly of claim 1, wherein at least one cam of the plurality of cams includes recessed patterns on a top surface and a bottom surface, said recessed patterns being configured to move the shuttle inside the disk drive.

6. The shuttle motion assembly of claim 1, wherein the vertical motion assembly further comprises a plate cam, said plate cam having a recessed pattern for directing vertical movement of the shuttle.

7. The shuttle motion assembly of claim 1, wherein the shuttle door accessing mechanism further comprises a plurality of levers, wherein one of the levers has a pin to engage an access hole located at a bottom surface of the shuttle.

8. The shuttle motion assembly of claim 7, wherein the access door opens circumferentially.

9. The shuttle motion assembly of claim 1, wherein the hook is configured to reach inside the cartridge to pull the shuttle into the disk drive.

10. A shuttle motion device positioned in a disk drive for loading and unloading a shuttle containing a disk into and out of the disk drive, comprising:

a hook configured and operable to attach to the shuttle to remove the shuttle from a cartridge that holds the shuttle in loading the shuttle and to insert the shuttle into the cartridge in unloading the shuttle;

a base plate;

a horizontal motion assembly positioned on the plate to move the shuttle along a horizontal plane to place the shuttle into and out of the disk drive for engaging and disengaging a motor for spinning one or more recordable medium contained in the shuttle, wherein the assembly comprises a plurality of channels for guiding a plurality of levers to cause movement of the shuttle along the horizontal plane, and wherein the hook is mechanically coupled to one of the channels and is driven by the one channel; and a plurality of circular cams positioned on the base plate and mechanically coupled to drive the channels and the levers by rotation to cause movements of the hook and the shuttle.

11. The device of claim 10, further comprising a vertical motion assembly positioned on the base plate, wherein the vertical assembly includes a lever and a cam plate that are mechanically driven by the circular cams.

12. The device of claim 10, further comprising a door-accessing mechanism mechanically coupled and driven by the circular cams to open an access door of the shuttle.

13. The device of claim 12, wherein the door-accessing mechanism comprises a lever with an engagement pin to engage a door access hole on the shuttle, and a plurality of interconnected levers that are mechanically coupled to the circular cams.

14. The device of claim 10, wherein each circular cam has a top surface and a bottom surface, each said surface including grooved patterns to control a sequence of movements among the plurality of levers to effect movements of the shuttle.

15. The device of claim 10, further comprising a hook to pull the shuttle into the disk drive.

16. A method of positioning a disk shuttle inside a disk drive, comprising:

placing a cartridge that encloses the shuttle at an entry door of the disk drive;

opening a door in the cartridge;

moving the shuttle along a horizontal plane to remove the shuttle out of the cartridge and place it over a motor inside the disk drive for spinning a disk contained inside the shuttle;

lowering the shuttle along a vertical plane to mount the shuttle on the motor;

providing a plurality of cams with recessed patterns to position the shuttle inside the disk drive with repeatable precision; and activating a door-access mechanism to open a door on the shuttle to expose the disk.

17. The method of claim 16, wherein the removing step is conducted by a hook which latches to the shuttle.

18. The method of claim 16, wherein the plurality of cams and a plurality of levers connected thereto constitute a motion amplification mechanism.

19. The method of claim 16, further comprising providing a gear train and a motor to furnish movement power.

* * * * *